United States Patent
Klein et al.

(10) Patent No.: US 9,180,820 B2
(45) Date of Patent: Nov. 10, 2015

(54) ARTICLE MOUNTING ASSEMBLY

(71) Applicant: Deere & Company, Moline, IL (US)

(72) Inventors: Arthur L. Klein, Cedar Falls, IA (US);
Curtis C. Carroll, Ankeny, IA (US);
Aron W. Fleischmann, Huxley, IA (US)

(73) Assignee: DEERE & COMPANY, Moline, IL (US)

( * ) Notice: Subject to any disclaimer, the term of this patent is extended or adjusted under 35 U.S.C. 154(b) by 57 days.

(21) Appl. No.: 14/015,137

(22) Filed: Aug. 30, 2013

(65) Prior Publication Data
US 2015/0060508 A1 Mar. 5, 2015

(51) Int. Cl.
| | |
|---|---|
| *B62D 49/08* | (2006.01) |
| *B60R 9/06* | (2006.01) |
| *B60R 11/06* | (2006.01) |
| *B62D 49/06* | (2006.01) |
| *A01B 76/00* | (2006.01) |
| *F16M 13/02* | (2006.01) |

(52) U.S. Cl.
CPC . *B60R 9/06* (2013.01); *A01B 76/00* (2013.01); *B60R 9/065* (2013.01); *B60R 11/06* (2013.01); *B62D 49/0628* (2013.01); *B62D 49/085* (2013.01); *F16M 13/02* (2013.01)

(58) Field of Classification Search
CPC .......................... B62D 49/085; B60R 2011/084
USPC .................. 224/410, 550, 560, 518; 248/201, 248/298.1, 307; 280/759
See application file for complete search history.

(56) References Cited

U.S. PATENT DOCUMENTS

| | | | | | |
|---|---|---|---|---|---|
| 2,499,654 | A | * | 3/1950 | Kuhlman | 224/410 |
| 2,560,570 | A | * | 7/1951 | Harig | 224/495 |
| 2,701,728 | A | * | 2/1955 | Miller | 280/759 |
| 2,889,097 | A | * | 6/1959 | Broehl | 224/542 |
| 2,981,554 | A | * | 4/1961 | Mulder et al. | 280/164.1 |
| 3,601,295 | A | * | 8/1971 | Lowe | 224/42.38 |
| 3,614,135 | A | * | 10/1971 | Eid | 280/491.5 |
| 3,658,219 | A | * | 4/1972 | Van Ordt | 224/540 |
| 3,730,545 | A | * | 5/1973 | Allori | 280/759 |
| 3,921,870 | A | * | 11/1975 | Camp | 224/511 |
| 4,257,545 | A | * | 3/1981 | Rhyan | 224/407 |
| 4,377,300 | A | * | 3/1983 | Old | 280/758 |
| 5,435,471 | A | * | 7/1995 | Chuang | 224/419 |
| 5,593,167 | A | * | 1/1997 | Barnhardt et al. | 280/164.1 |
| D440,984 | S | * | 4/2001 | Norfleet | D15/28 |

(Continued)

FOREIGN PATENT DOCUMENTS

EP 2380804 A1 10/2011

OTHER PUBLICATIONS

K&M Manufacturing, Weight Boxes and brackets, web pages, 2008, 3 pages.

(Continued)

*Primary Examiner* — Justin Larson

(57) ABSTRACT

An article mounting assembly mounts an article to a horizontally extending ballast weight support of a utility vehicle. The mounting assembly includes a coupling member, a plate and a pair of brackets. The coupling member is attached to and spaced apart from the plate. Each bracket has a front end coupled to the coupling member and has a rear end coupled to the weight support. Each bracket is movably coupled to the coupling member so that the spacing between the brackets is adjustable. The article may be a container in which the plate forms a wall of the container, or the article may be a shelf or a component supported by the brackets.

15 Claims, 5 Drawing Sheets

(56) References Cited

U.S. PATENT DOCUMENTS

| | | | |
|---|---|---|---|
| 6,533,319 B1 * | 3/2003 | Denby et al. | 280/759 |
| 6,595,397 B2 | 7/2003 | Teich | |
| D497,537 S * | 10/2004 | O'Keene et al. | D8/355 |
| 7,097,082 B2 * | 8/2006 | Wallaker | 224/483 |
| 7,204,397 B2 * | 4/2007 | Powell et al. | 224/410 |
| 7,267,253 B2 * | 9/2007 | McCoy et al. | 224/509 |
| 7,802,709 B1 * | 9/2010 | Lewis et al. | 224/560 |
| 8,028,877 B2 * | 10/2011 | Lien | 224/417 |
| 8,083,111 B2 | 12/2011 | Lase | |
| 8,419,064 B2 * | 4/2013 | Erhardt | 280/759 |
| 8,430,427 B1 * | 4/2013 | Gaeddert et al. | 280/759 |
| 8,556,220 B1 * | 10/2013 | Chen | 248/222.13 |
| 8,662,460 B2 * | 3/2014 | Heimbuch et al. | 248/205.1 |
| 8,708,294 B2 * | 4/2014 | Lam et al. | 248/292.14 |
| 2004/0011837 A1 * | 1/2004 | McCoy et al. | 224/509 |
| 2010/0236955 A1 | 9/2010 | Lase | |
| 2011/0204110 A1 * | 8/2011 | Read et al. | 224/560 |
| 2015/0060508 A1 * | 3/2015 | Klein | 224/545 |

OTHER PUBLICATIONS

TIG Concept, "JohnBox", date unknown (admitted in production prior to present invention), 1 page.

European Search Report issued in counterpart of application No. 14179074.1, dated Dec. 23, 2014 (4 pages).

* cited by examiner

ARTICLE MOUNTING ASSEMBLY

FIELD

The present disclosure relates to a mounting assembly for mounting an article to the exterior of a utility vehicle, such as a tractor.

BACKGROUND

Detachable articles, such as storage containers, are often externally mounted to utility vehicles. Such articles can be used as toolboxes, for storage of the tools necessary for maintenance of the vehicle, and for storage of tools for installation tasks and minor repairs. For example, it is known to mount a bracket near the steps of the John Deere 6400 series tractor, and to attach thereto a toolbox. Since these storage articles are attached to the exterior sides of the vehicle, and because of the small amount of available space, known toolboxes are relatively small and permit only a few tools to be stored. When the utility vehicle is away from where it is usually kept for extended periods, many items that should be brought along cannot be or must be accommodated elsewhere, since there is no room in the toolbox. Such items may include chains, attachment devices, spare parts, a large hammer, protective clothing, and rubber boots.

Modern agricultural tractors utilize most of the space that traditional tool boxes would normally mount. Customers demand a larger tool box to carry many tools and larger items like log chains. Certain forward mount tool box designs take the space that is normally reserved for suitcase weights. This limits the tractor operator's ability to ballast the tractor properly.

K & M Manufacturing provides a variety of weight or ballast boxes. Some K & M weight box models are mounted ahead of the ballast weights and are supported by brackets which are coupled to the ballast weights. Some K & M weight box models are mounted in place of the ballast weights and are supported by brackets which are hooked to the ballast weight support arm. In all these designs, the brackets are fixedly attached to the box and the separation between the boxes is not adjustable.

U.S. Pat. No. 6,595,397, issued in 2003 to Teich, and assigned to the assignee of the present application shows an article mounted in front of a ballast weight. A mounting bar projects from a rear wall of the article and into a forward opening recess formed in the ballast weight. The mounting bar is coupled to the ballast weight by a pin which extends vertically through bores in the ballast weight and a bore in the mounting bar. As a result, at least some of the ballast weights must be modified or adapted to receive and couple to the mounting bar.

SUMMARY

According to an aspect of the present disclosure, a mounting assembly is provided for mounting an article to a vehicle. The vehicle has a horizontally extending weight support at a front end thereof. The weight support is adapted to support a plurality of ballast weights thereon. The article may include a plurality of walls and including an rear end wall which faces towards the weight support. The article may be a shelf or a component, such as a light module. The article mounting assembly includes a coupling member and a pair of brackets. The coupling member is attached to the end wall. Each bracket has a front end coupled to the coupling member and a rear end coupled to the weight support. Each bracket is movably coupled to the coupling member so that the spacing between the brackets is adjustable. This mounting assembly can mount a front mounted tool box to the front weight support on tractors and can be mounted with preferably a minimum of 4, and up to a full rack of "suitcase" type ballast weights. The mounting brackets mount to the weight support in the same fashion that the suitcase weights mount. These brackets are coupled to the back portion of the article and hold the article forward of the weights.

DETAILED DESCRIPTION OF THE DRAWINGS

Figure 1:
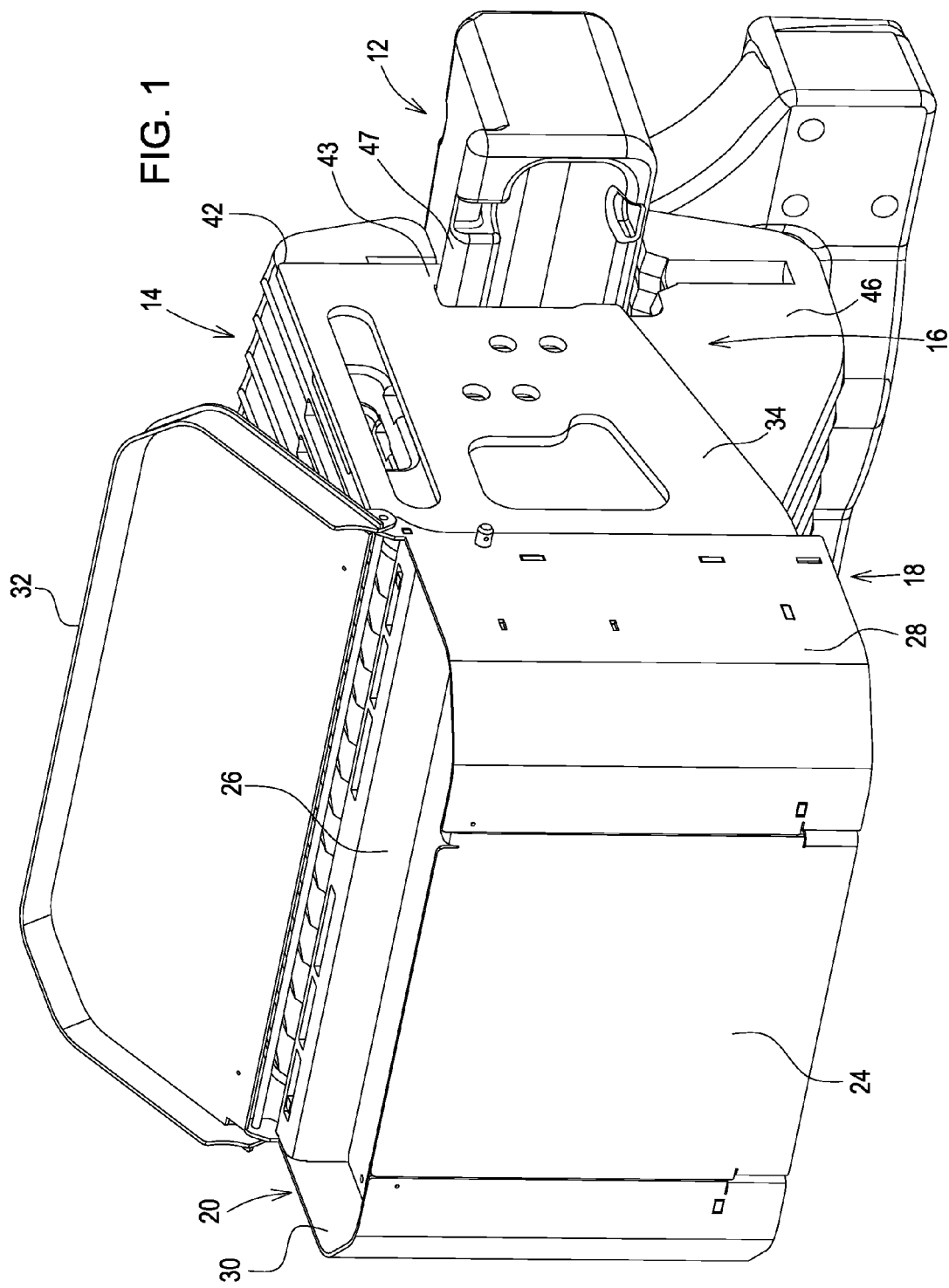
FIG. 1 is a top left side perspective view of an article mounting assembly embodying the invention.

Referring to FIG. 1, a conventional horizontally and laterally extending weight support or weight bar 12 is adapted to be mounted at an end of a vehicle, such as at the front or forward end of a tractor (not shown). The weight support 12 supports a plurality of conventional ballast weights 14.

A mounting assembly 16 is mounted to the weight support 12. The mounting or support assembly 16 supports an article 20 such as a tool box, which is positioned outwardly and preferably outboard of the weights 14. The mounting assembly 16 includes a pair of brackets 34 and 36 and a plate 26. Each bracket 34 and 36 has a forward end 38, 40 coupled to the plate 26, a rear end 42, 44 coupled to the weight support 12, and a body 46, 48. The rear ends 42, 44 form hooks 43, 45 which are hooked over a lip 47 which is formed on the weight support 12. The body 46, 48 is adapted to be placed adjacent to at least one of the ballast weights 14. Alternatively, not shown) each bracket 34, 36, may be sandwiched between adjacent pairs of ballast weights 14, or spaced apart therefrom if only a few weights 14 are mounted on the weight support 12.

Figure 2:
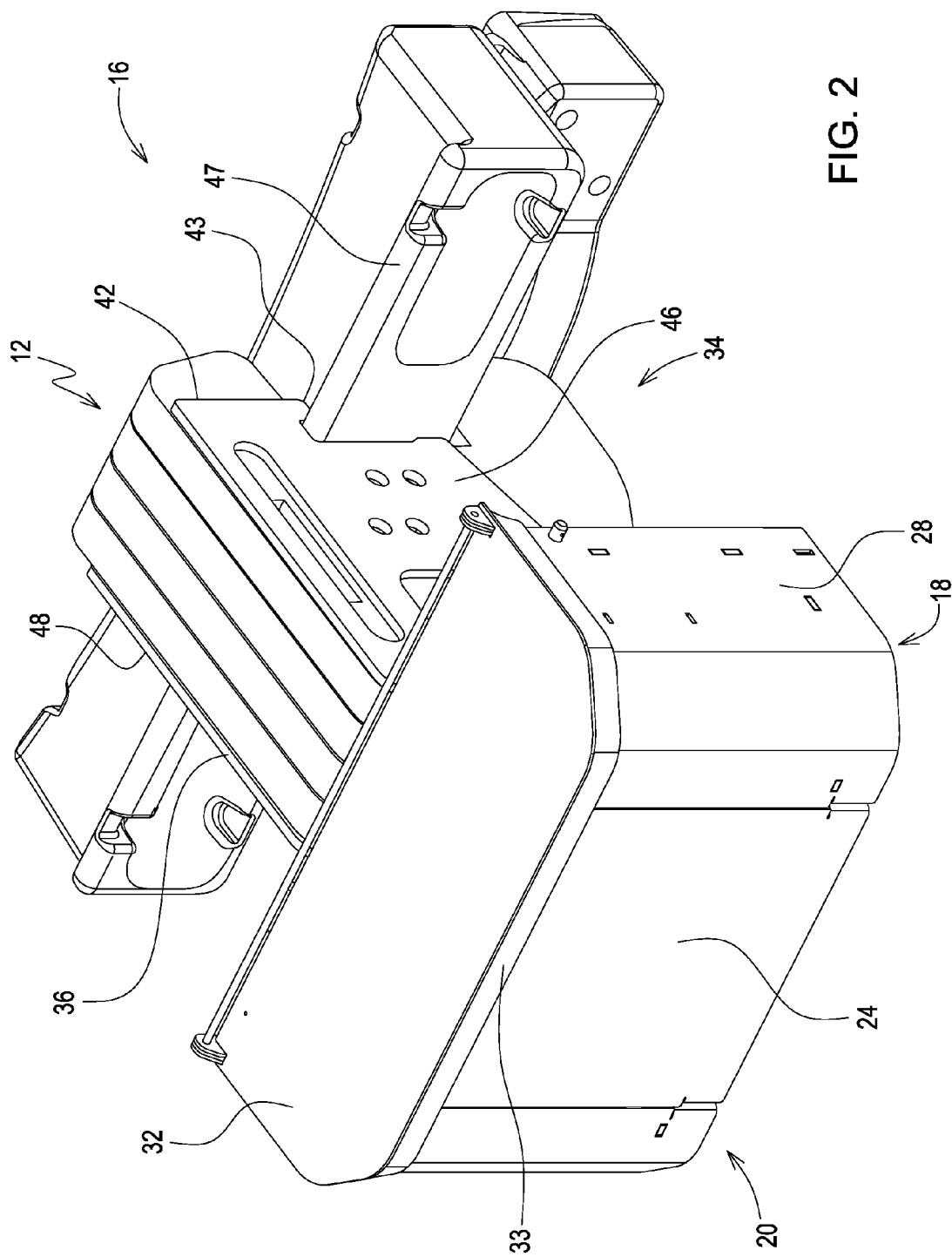
FIG. 2 is a perspective view of an article mounting assembly similar to the view of FIG. 1, but fewer weights between the support brackets.
Figure 3:
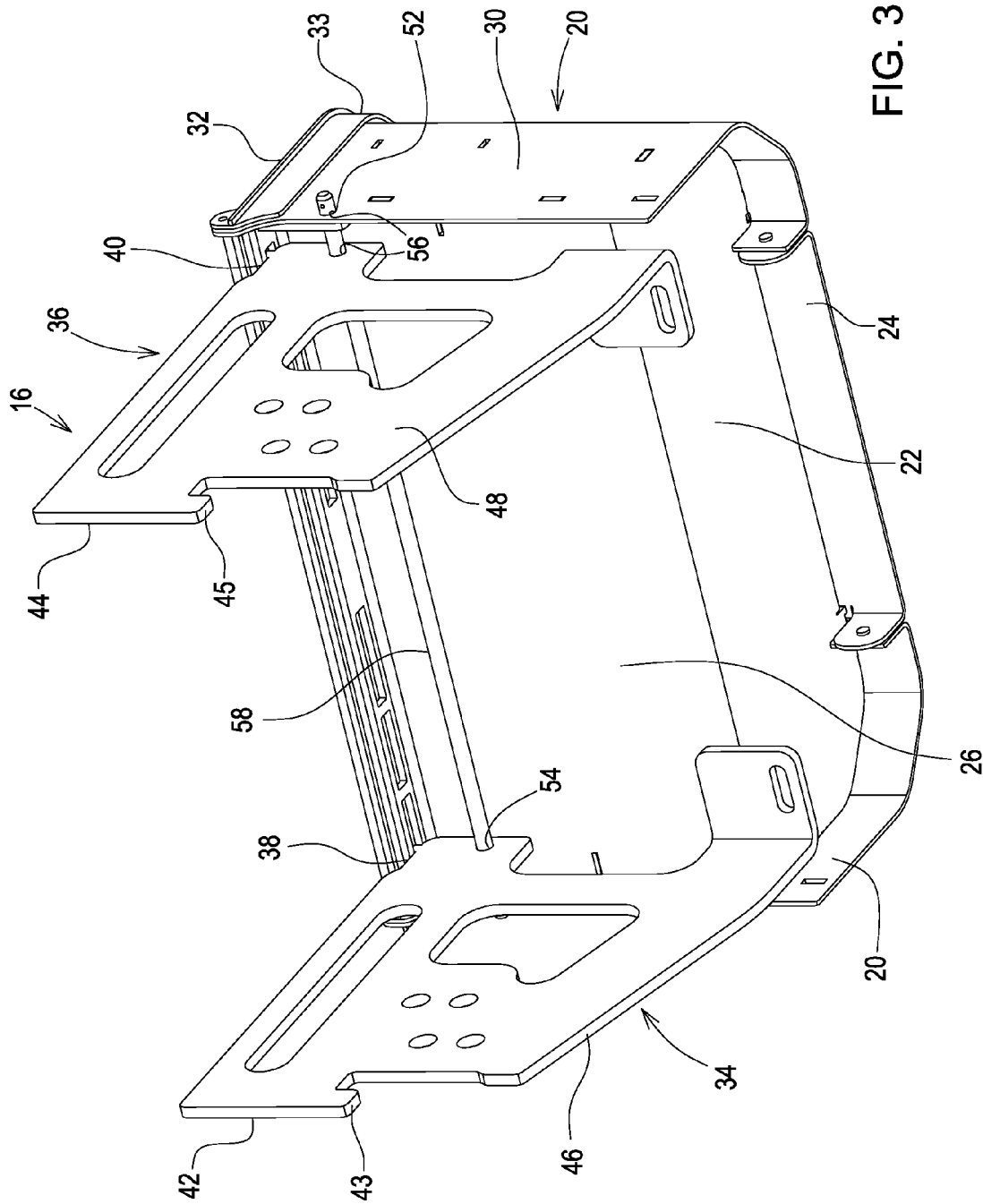
FIG. 3 is a bottom right side perspective view of the article mounting assembly view of FIG. 1 with the weight support bar removed for clarity.

As best seen in FIGS. 2 and 3, the article 20 includes a bottom wall 22, a front end wall or door 24, a back end wall formed by the plate 26, a first side wall 28, a second side wall 30 and a lid 32. The lid 32 has a lip 33 which overlaps and surrounds the upper edge of plate 26 and walls 24 and 28. The side walls 28 and 30 are bent to form curved corners 29 and 31, and mate with the corresponding sides of the front wall 24. The back left corner of the lid 32 is pivotally coupled to the back top corner of the side wall 28, and back right corner of the lid 32 is pivotally coupled to the back top corner of the side wall 30. Plate 26 faces towards the weight support 12.

As best seen in FIG. 3, each bracket forward end 38, 40 is spaced apart inwardly from a corresponding one of the article side walls 28, 30. A first side wall mounting bore 50 is formed in the first side wall 28, and a second side wall mounting bore 52 is formed in the second side wall 30. A first bracket bore 54 is formed in the first bracket 34, and a second bracket bore 56 is formed in the second bracket 36. A coupling member or rod 58 extends horizontally through all these bores to attach or couple the side walls 28 and 30 and thus, the article 20, to the brackets 34 and 36. Each bracket 34, 36 includes a flange 60, 62 which extends laterally towards each other from a lower front potion of the body 46, 48. Each flange 60, 62 but against or engages a lower portion of the plate 26. The coupling member or rod 58 is coupled to and spaced apart from the plate 26, and the brackets 34 and 36 slidably engage the rod 58, and the separation between the brackets 34 and 36 can be adjusted. Because of this adjustability, different numbers of weights 14 can be placed between the spaced apart support plates 34 and 36. As best seen in FIG. 2, the bracket 34, 36 can be placed closer together with fewer, such as four, ballast weights 14 sandwiched therebetween.

Figure 4:
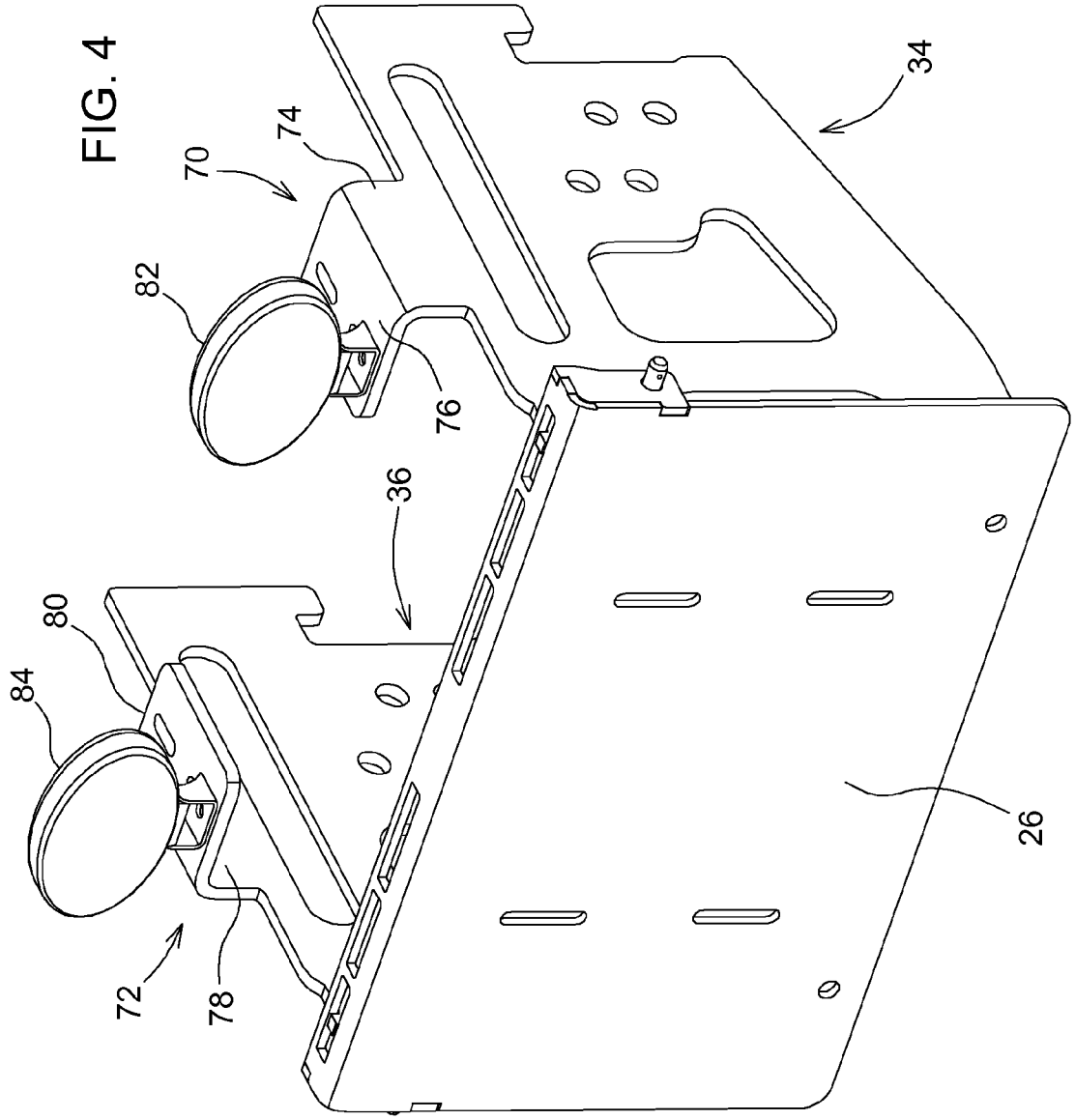
FIG. 4 is a perspective view of an alternative article mounting assembly.
Figure 5:
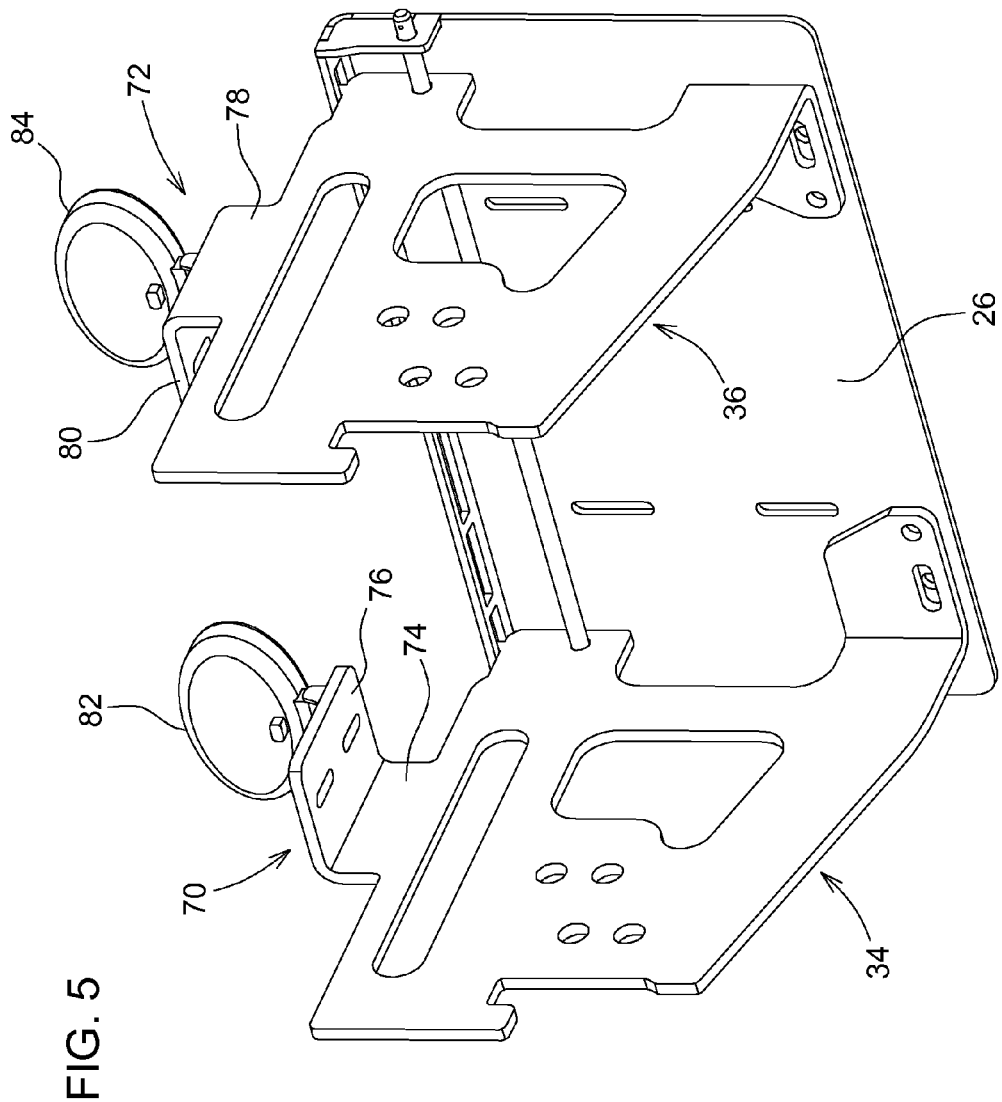
FIG. 5 is another perspective view of the article mounting assembly of FIG. 4.

Referring now to FIGS. 4 and 5, each bracket 34 and 36 may also include a corresponding support flange 70, 72 which is mounted on an upper edge thereof. Support flange 70 has a vertical leg 74 and a horizontal leg 76 which extends horizontally from an upper end of leg 74 and towards support flange 72. Support flange 72 has a vertical leg 78 and a horizontal leg 80 which extends horizontally from an upper end of leg 78 and towards support flange 70. Various article or items can be mounted on or supported by flanges 70 and 72. For example, lighting units 82 and 84 can be mounted thereon. Alternatively, a shelf member (not shown) can be mounted on the flanges 70 and 72. Alternatively, a mounting assembly can be formed which combines the flanges 70 and 72 together with the article or tool box 20.

The result is an article mounting or support assembly which can be used with standard unmodified ballast weights 14. This mounting assembly can be used to support a front mounted tool box on an agricultural tractor fitted with front mounted suitcase weights. The mounting assembly could be used to mount items other than a tool box. For example, this mounting assembly could be used to mount small fluid tanks or other accessories. This mounting assembly could also be used to mount a vertical plate which could have mounting holes for a variety of components and accessories.

While the disclosure has been illustrated and described in detail in the drawings and foregoing description, such illustration and description is to be considered as exemplary and not restrictive in character, it being understood that illustrative embodiments have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

We claim:

1. A mounting assembly for mounting an article to a vehicle, the vehicle having a horizontally extending weight support at an end thereof, the weight support being adapted to support a plurality of ballast weights thereon, the mounting assembly comprising:
a plate spaced apart from the weight support;
a coupling member attached to the plate; and
a pair of brackets, each bracket having a first end coupled to the coupling member and having a second end coupled to the weight support, and each bracket being movably coupled to the coupling member so that a spacing between the brackets is adjustable;
wherein the coupling member extends through bores formed in the brackets.

2. The mounting assembly of claim 1, wherein:
the coupling member is spaced apart from the plate, and each bracket slidably engages the coupling member.

3. The mounting assembly of claim 1, wherein:
the coupling member comprises a rod.

4. The mounting assembly of claim 1, wherein:
the coupling member is spaced apart from the plate.

5. The mounting assembly of claim 1, wherein:
the article comprises first and second side walls joined to opposite sides of the plate; and
the coupling member extends through bores formed in the side walls.

6. The mounting assembly of claim 1, wherein:
each bracket having a body which is adapted to be adjacent to at least one of the ballast weights.

7. The mounting assembly of claim 1, wherein:
the article comprises first and second side walls joined to opposite sides of the plate; and
each bracket forward end is spaced apart inwardly from a corresponding one of the side walls.

8. The mounting assembly of claim 1, wherein:
a portion of at least one of the brackets is sandwiched between an adjacent pair of ballast weights.

9. The mounting assembly of claim 1, wherein:
the article comprises first and second side walls joined to opposite sides of the plate;
a first mounting bore is formed in the first side wall, a second mounting bore is formed in the second side wall, the coupling member extends through the mounting bores; and
the brackets slidably engage the coupling member.

10. The mounting assembly of claim 1, wherein:
a mounting flange is attached to each bracket, and the article is mounted on the mounting flanges.

11. The mounting assembly of claim 1, wherein:
a mounting flange is attached to an upper edge of each bracket, and the article is mounted on an upper surface of the mounting flanges.

12. A mounting assembly for mounting an article to a vehicle, the vehicle having a horizontally extending weight support at an end thereof, the weight support being adapted to support a plurality of ballast weights thereon, the mounting assembly comprising:
a plate spaced apart from the weight support;
a coupling member attached to the plate; and
a pair of brackets, each bracket having a first end coupled to the coupling member and having a second end coupled to the weight support, and each bracket being movably coupled to the coupling member so that a spacing between the brackets is adjustable;
wherein:
the article comprises first and second side walls joined to opposite sides of the plate;
a first mounting bore is formed in the first side wall, a second mounting bore is formed in the second side wall, a first bracket bore is formed in the first bracket, a second bracket bore is formed in the second bracket; and
a rod extends through all said bores to attach the side walls to the brackets.

13. The mounting assembly of claim 12, wherein:
each bracket includes a flange which extends laterally from a lower front potion of the bracket, the flange engaging a lower portion of the end wall.

14. The mounting assembly of claim 12, wherein:
each bracket includes a forward end which is spaced apart inwardly from a rear end of a corresponding one of the side walls.

15. A mounting assembly for mounting an article to a vehicle, the vehicle having a horizontally extending weight support at an end thereof, the weight support being adapted to support a plurality of ballast weights thereon, the mounting assembly comprising:

a plate spaced apart from the weight support;
a coupling member attached to the plate;
a pair of brackets, each bracket having a first end coupled to the coupling member and having a second end coupled to the weight support, and each bracket being movably coupled to the coupling member so that a spacing between the brackets is adjustable;
the article having a plurality of walls forming a container, one of said walls being formed by the plate; and
a mounting flange is attached to an upper edge of each bracket, and a further article is mounted on an upper surface of the mounting flanges.

* * * * *